United States Patent
Ye

(10) Patent No.: US 12,402,119 B2
(45) Date of Patent: Aug. 26, 2025

(54) MULTIPLE UPLINK CARRIERS IN A CELL DEPLOYED IN UNLICENSED SPECTRUM

(71) Applicant: GOOGLE LLC, Mountain View, CA (US)

(72) Inventor: Shiangrung Ye, New Taipei (TW)

(73) Assignee: GOOGLE LLC, Mountain View, CA (US)

( * ) Notice: Subject to any disclaimer, the term of this patent is extended or adjusted under 35 U.S.C. 154(b) by 314 days.

(21) Appl. No.: 17/290,751

(22) PCT Filed: Oct. 31, 2019

(86) PCT No.: PCT/US2019/059193
§ 371 (c)(1),
(2) Date: Apr. 30, 2021

(87) PCT Pub. No.: WO2020/092787
PCT Pub. Date: May 7, 2020

(65) Prior Publication Data
US 2021/0385836 A1    Dec. 9, 2021

Related U.S. Application Data

(60) Provisional application No. 62/754,415, filed on Nov. 1, 2018.

(51) Int. Cl.
*H04W 72/1268*    (2023.01)
*H04W 16/14*    (2009.01)
(Continued)

(52) U.S. Cl.
CPC ....... *H04W 72/1268* (2013.01); *H04W 16/14* (2013.01); *H04W 72/0453* (2013.01); *H04W 72/23* (2023.01)

(58) Field of Classification Search
CPC ...... H04L 5/001; H04L 5/0098; H04W 16/14; H04W 72/0453; H04W 72/1268; H04W 72/23; H04W 76/15; H04W 76/20
See application file for complete search history.

(56) References Cited

U.S. PATENT DOCUMENTS

2014/0369242 A1    12/2014    Ng et al.
2015/0256303 A1     9/2015    Belghoul et al.
(Continued)

FOREIGN PATENT DOCUMENTS

CN    102150466 A    8/2011
CN    102612851 A    7/2012
(Continued)

OTHER PUBLICATIONS

"3rd Generation Partnership Project; Technical Specification Group Radio Access Network; NR; Medium Access Control (MAC) protocol specification (Release 15)", 3GPP (2018). Retrieved from the Internet at: <URL:<http://www.3gpp.org/ftp/tsg%255> Fran/WG2%5FRL2/Specifications/201809%5Fdraft%5Fspec s%5Fafter%5FRAN%5F81/Draft%5F3832I%2Df30%5Fv2%2Ezip>.
(Continued)

*Primary Examiner* — Pao Sinkantarakorn
(74) *Attorney, Agent, or Firm* — MARSHALL, GERSTEIN & BORUN LLP

(57) ABSTRACT

Processing hardware (134) in a base station (104) can implement a method for configuring uplink communications in an unlicensed spectrum. The method includes selecting a first uplink carrier and a second uplink carrier for a cell to operate as a normal uplink carrier (NUL) and a supplementary uplink carrier (SUL), respectively, with at least one of the NUL or the SUL operating within one or more unlicensed bands the user device supports (704). The method further includes transmitting, to the user device, configuration data for the NUL and the SUL (706), including trans-
(Continued)

mitting an indication that one of the carriers is the NUL, and the other carrier is the SUL, such that the user device is configured to initially transmit via the NUL. The method also includes receiving uplink data via the second uplink carrier upon the user device switching from the first uplink carrier to the second uplink carrier (712).

16 Claims, 7 Drawing Sheets

(51) Int. Cl.
*H04W 72/0453* (2023.01)
*H04W 72/23* (2023.01)

(56) References Cited

U.S. PATENT DOCUMENTS

| | | | |
|---|---|---|---|
| 2016/0337893 | A1 | 11/2016 | Gheorghiu et al. |
| 2018/0020452 | A1 | 1/2018 | Yerramalli et al. |
| 2018/0027553 | A1 | 1/2018 | Matsumoto et al. |
| 2019/0026142 | A1 | 1/2019 | Kato |
| 2020/0053799 | A1 | 2/2020 | Jeon et al. |
| 2020/0100170 | A1* | 3/2020 | Babaei .............. H04W 74/0833 |
| 2020/0187210 | A1* | 6/2020 | Xie ........................ H04L 5/0098 |
| 2021/0068147 | A1* | 3/2021 | Sato ....................... H04W 72/04 |
| 2021/0378046 | A1* | 12/2021 | Shimoda .............. H04W 76/15 |
| 2021/0410186 | A1* | 12/2021 | Hajir .................. H04W 74/0816 |
| 2022/0417804 | A1* | 12/2022 | Freda .................... H04W 36/30 |

FOREIGN PATENT DOCUMENTS

| | | |
|---|---|---|
| CN | 106430467 A | 2/2017 |
| CN | 106658740 A | 5/2017 |
| CN | 107078887 A | 8/2017 |
| CN | 107432032 A | 12/2017 |
| CN | 107534991 A | 1/2018 |
| CN | 107624264 A | 1/2018 |
| WO | WO-2018/171927 A1 | 9/2018 |
| WO | WO-2019/061115 A1 | 4/2019 |
| WO | WO-2019/099709 A1 | 5/2019 |

OTHER PUBLICATIONS

"3rd Generation Partnership Project; Technical Specification Group Radio Access Network; NR; Multiplexing and channel coding (Release 15)" 3GPP Draft (2018).
"3rd Generation Partnership Project; Technical Specification Group Radio Access Network; NR; NR and NG-RAN Overall Description; Stage 2 (Release 15)" 3GPP Draft 2018).
Ericsson et al., "New Work Item on enhanced LAA for LTE," 3GPP Draft (2015).
Ericsson et al., "Study on Licensed-Assisted Access to Unlicensed Spectrum," 3GPP Working Procedures (2014).
Huawei Hisilicon: "Views on LTE Rel-14", 3GPP Draft; RP-151356 Huawei Views on LTE REL-14, 3rd Generation Partnership Project (3GPP), Mobile Competence Centre (2015). Retrieved from the Internet at: <URL:<http://www.3gpp.org/ftp/tsg%5Fran/TSG%25> 5FRAN/TSGR%5F69/Docs/RP%2D151356%2Ezip>.
International Search Report and Written Opinion for Application No. PCT/US2019/059193, dated Jan. 29, 2020.
Qualcomm Incorporated, "Study on NR-based Access to Unlicensed Spectrum," 3GPP Draft (2018).
Samsung, "Initial access for supplementary uplink frequency", 3GPP Draft; R2-1711807 Initial Access for SUL, 3rd Generation Partnership Project (3GPP) (2017). Retrieved from the Internet at: <URL:<http://www.3gpp.org/ftp/tsg_ran/WG2_RL>2/TSGR2_99bis/Docs/>.
Samsung: "Connected mode aspects of supplementary uplink frequency", 3GPP Draft; R2-1711808 Connected Mode Aspects of SUL, 3rd Generation Partnership Project (3GPP), Mobile Competence Centre (2017). Retrieved from the Internet at: <URL:<http://www.3gpp.org/ftp/tsg> ran/WG2RL2/TSGR2_99bis/Docs/>.
First Office Action for Chinese Application No. 201980072423.5, dated Nov. 7, 2023.
Ericsson, "Switch Between SUL and NUL During Ongoing RA Procedure," 3GPP Draft (2018).
Office Action for European Application No. 19805863.8, dated Oct. 23, 2023.
Lu et al., "Subcarrier and Power Allocation Algorithm in Uplink of Cognitive Radio Networks," Journal of Jilin Unviversity, 40(4):1144-1149 (2010).
Notice of Allowance for Chinese Application No. 201980072423.5, dated Aug. 29, 2024.

* cited by examiner

_MULTIPLE UPLINK CARRIERS IN A CELL DEPLOYED IN UNLICENSED SPECTRUM_

FIELD OF THE DISCLOSURE

This disclosure relates to wireless communications and, more particularly, to configuring uplink carriers for a user device operating in a cell deployed in unlicensed spectrum.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some cases, base stations and user devices operating in wireless communication networks can utilize both licensed and unlicensed spectrum. For example, base stations and user can utilize Licensed Assisted Access (LAA) techniques to access the unlicensed spectrum. According to the Long Term Evolution (LTE) standards, secondary cells (SCells) can operate in the unlicensed spectrum, whereas primary cells (PCell) must operate in the licensed spectrum. 5G Next Radio (NR) communication standards proposes to also deploy PCells in the unlicensed spectrum, in some cases.

In addition extending unlicensed spectrum to PCells, NR supports supplementary uplink (SUL) communications in a cell to provide better coverage in the uplink direction. Unlike cells with one normal uplink (NUL) carrier and one normal downlink (NDL) carrier, such a cell includes one NUL carrier, one SUL carrier, and an NDL carrier.

Further, carriers (i.e., physical channels) can occupy higher or lower portions of the spectrum. High-frequency spectrum in general corresponds to larger pathloss and larger penetration loss than low-frequency spectrum. For example, deploying a NUL in a high-frequency band reduces the coverage of the cell. On the other hand, in general larger transmissions bandwidths are available in high-frequency spectrum, which allows devices to increase data transmission rate.

SUMMARY

Generally speaking, the techniques of this disclosure allow a base station to configure uplink communications from a user device via two uplink carriers, with at least one of the uplink carriers deployed in the unlicensed spectrum. One of the uplink carriers can operate as a NUL and the other uplink carrier can operate as a SUL. To take advantage of respective benefits of transmitting in low- and high-frequency spectrum, the base station can allocate one of the uplink carriers in a high-frequency transmission band and allocate the other uplink carrier in a low-frequency transmission band (e.g., with an example central frequency separation of 20 MHz or more).

In operation, the user device switches from the first uplink carrier to the second uplink carrier (and, when appropriate, back to the first uplink carrier) in response to a command from a base station or upon evaluating one or both uplink carriers at the user device. More particularly, each of the user device and the base station can estimate pathloss and calculate a metric of a channel status for a carrier. A channel status metric can reflect the amount of interference, an amount of traffic, power level, etc. The user device and/or the base station can compare pathloss (which also can be a quantitative metric) and the channel status metric to threshold values to determine when the user device should switch between carriers.

In some example scenarios, when the user device experiences large pathloss, or high interference, or high traffic load on the first uplink carrier, the user device switches uplink transmissions to the second uplink carrier. When the user device experiences large pathloss, or high interference, or high traffic load on the second uplink carrier, the user device switches uplink transmissions to the first uplink carrier.

To mitigate race conditions and the so-called ping pong effect, where the user device and the base stations frequently arrive at conflicting decisions regarding uplink carrier selection, the user device and the base station can run timers to prevent the user device from switching again within a certain period of time.

One example embodiment of these techniques is a method in a base station for configuring uplink communications in an unlicensed spectrum, which can be executed by processing hardware. The method includes selecting a first uplink carrier and a second uplink carrier for a cell, including selecting at least one of the first uplink carrier and the second uplink carrier from within one or more unlicensed bands the user device supports. The method further includes transmitting, to the user device, configuration data for the first uplink carrier and the second uplink carrier, and receiving uplink data via the second uplink carrier upon the user device switching from the first uplink carrier to the second uplink carrier.

Another example implementation of these techniques is a non-transitory computer-readable medium that stores instructions which, when executed by processing hardware, cause a base station to implement the method in the base station above.

Yet another example embodiment of these techniques is a method in a user device, which can be executed by processing hardware. The method includes receiving, from a base station for a certain cell, a configuration of a first uplink carrier and a second uplink carrier, such that at least one of the first uplink carrier and the second uplink carrier are allocated in an unlicensed spectrum. The method further includes transmitting data over the first uplink carrier, detecting a condition for switching from the first carrier to the second carrier and, in response to detecting the condition, transmitting further data over the second uplink carrier.

Still another example implementation of these techniques is a non-transitory computer-readable medium that stores instructions which, when executed by processing hardware, cause a base station to implement the method in the user device above.

DETAILED DESCRIPTION OF THE DRAWINGS

Some of the techniques of this disclosure can be implemented in a user device (commonly referred to using the acronym UE, which stands for "user equipment"), and some can be implemented in a cellular infrastructure, e.g., in a base station or a CN. Generally speaking, these techniques allow a UE to dynamically switch between uplink carriers when transmitting data to a base station. As used herein, "switching" between uplink carriers can refer to moving uplink transmissions from Physical Uplink Shared Channel (PUSCH), Physical Uplink Control Channel (PUCCH), Signal Reference Signal (SRS), etc. on one carrier to the other carrier. When the base station allocates these uplink carriers in different parts of the spectrum, there may be a significant difference in various aspects of the performance of these uplink carriers, and thus the UE in different situations can select the better performing uplink carrier.

These techniques are discussed below with example reference to New Radio (NR). However, in general the techniques of this disclosure also can apply to other radio access technologies (RATs).

Figure 1:
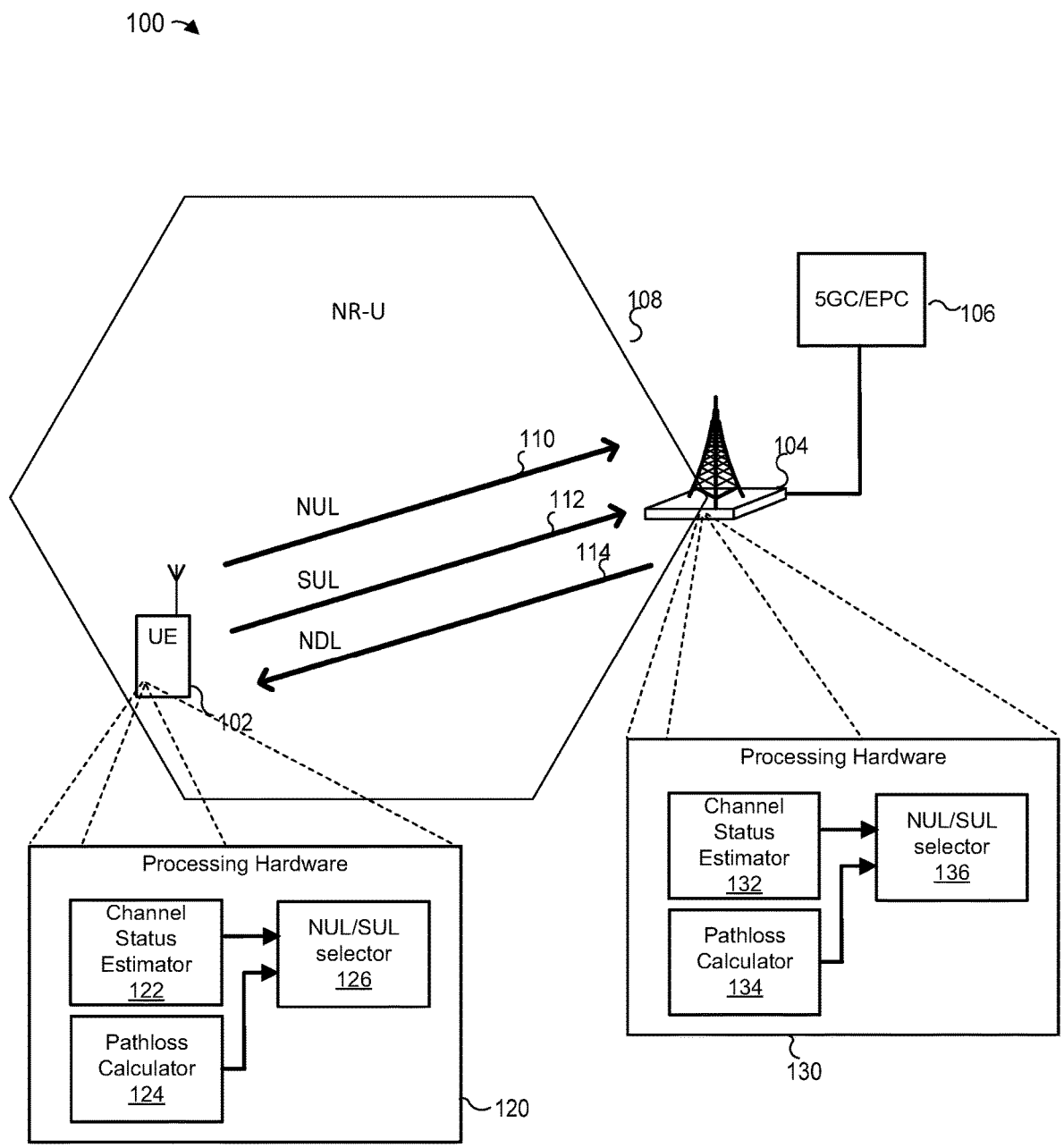
FIG. 1 is a block diagram of an example wireless communication system in which a base station can configure a user device with two uplink carriers in a same cell, and the user device can switch between two uplink carriers in a cell deployed at least partially in unlicensed spectrum.

Referring first to FIG. 1, a UE 102 can operate in an example wireless communication network 100. As discussed below, the UE 102 can be any suitable device capable of wireless communications. The wireless communication network 100 includes an NR base station 104 connected to an EPC or 5GC 106. The base station 104 operates as a next-generation evolved Node B (gNB) and covers an NR unlicensed (NR-U) cell 108. In particular, the base station 104 deploys the cell 108 at least partially in unlicensed spectrum. The cell 108 can be a primary cell (PCell) or a secondary cell (SCell).

The base station 104 configures the UE 102 to communicate with the base station 104 over a normal uplink carrier (NUL) 110 and a supplementary uplink carrier (SUL) 112 in the uplink direction, and over a normal downlink carrier (NDL) 114 in the downlink direction. The base station 104 associates the NUL 110 and the SUL 112 with the same cell 108.

In one example implementation, the base station 104 selects the NUL 110 from within an unlicensed band and the SUL 112 from within an licensed band. In another example implementation, the base station 104 selects the NUL 110 from within a licensed band and the SUL 112 from within an unlicensed band. In yet another example implementation, the base station 104 selects both the NUL 110 and the SUL 112 from within an unlicensed band.

In some implementations, the base station 104 allocates one of the carriers 110, 112 in high-frequency spectrum and the other one of the carriers 110, 112 in low-frequency spectrum. For example, the base station 104 can allocate the NUL 110 in high-frequency spectrum and the SUL 112 in low-frequency spectrum. When choosing the carriers 110 and 112, the base station 104 in various implementations uses contiguous portions of the spectrum or non-contiguous portions of the spectrum. Thus, high-frequency spectrum within which the base station 104 selects the carrier 110 can correspond to one contiguous transmission band or multiple non-continuous transmission bands, and the low-frequency spectrum within which the base station 104 selects the carrier 112 similarly can correspond to one contiguous transmission band or multiple non-continuous transmission bands.

In one example implementation, the central frequency of the transmission band in high-frequency spectrum, within which the base station 104 selects the carrier 110 or 112, is approximately 26 GHz. In alternative implementations, this central frequency is approximately 28 GHz or 39 GHz. The central frequency of the transmission band in low-frequency spectrum, within which the base station 104 selects the other carrier 110 or 112 according to these implementations, is approximately 700 MHz, 800 MHz, 900 MHz, or 1800 MHz. More generally, the transmission band in high-frequency spectrum can be separated from the transmission band in low-frequency spectrum by at least a certain bandwidth, e.g., 20 MHz, 200 MHz, 1 GHz. Further, in an example implementation, the high-frequency transmission band is disposed above 6 GHz, and the low-frequency transmission band is disposed below 6 GHz.

With continued reference to FIG. 1, the UE 102 can be equipped with processing hardware 120 that can include one or more general-purpose processors (e.g., CPUs) and a non-transitory computer-readable memory storing instructions that the one or more general-purpose processors execute. Additionally or alternatively, the processing hardware 120 can include special-purpose processing units.

The processing hardware 120 can include a channel status estimator 122, a pathloss calculator 124, and a NUL/SUL selector 126. Each of the controllers 122, 124, and 126 can be implemented using any suitable combination of hardware, software, and firmware. In one example implementation, the controllers 122, 124, and 126 are sets of instructions that define respective components of the operating system of the UE 102, and one or more CPUs execute these instructions to perform the corresponding functions. In another implementation, some or all of the controllers 122, 124, and 126 are implemented using firmware as a part of the wireless communication chipset.

Similarly, the base station 104 can be equipped with processing hardware 130 that can include one or more general-purpose processors (e.g., CPUs) and a non-transitory computer-readable memory storing instructions that the one or more general-purpose processors execute. Additionally or alternatively, the processing hardware 130 can include special-purpose processing units. The processing hardware 130 can include a channel status estimator 132, a pathloss calculator 134, and a NUL/SUL selector 136. Similar to the controllers 122, 124, and 126, each of the controllers 132, 134, and 136 can be implemented using any suitable combination of hardware, software, and firmware.

As discussed in more detail below, the processing hardware 130 of the base station 104 initially configures the UE 102 with the NUL 110 and SUL 112. The UE 102 thus initially transmits data in the uplink direction over the NUL 110. However, the channel status estimator 122 generates a metric indicative of the current condition of the NUL 110 and/or the SUL 112, i.e., of how well the NUL 110 and/or the SUL 112 perform in terms of interference, traffic load, power level, etc. This metric can be any suitable quantitative indicator and is referred below as the "channel status metric." The channel status estimator 122 in various implementations generates the metric periodically (e.g., after a certain amount of time, a certain number of transmitted frames) or in response to certain events, such as indications from upper layers that packets are lost or delayed. Moreover, the channel status estimator 122 in some implementations operates with the periodicity, or in accordance with conditions, specified by the base station 104.

The pathloss calculator 124 can determine pathloss of the NUL 110 and/or the SUL 112. Similar to the channel status estimator 122, the pathloss calculator 124 can calculate pathloss periodically, in response to events at the UE 102, or in accordance with the commands from the base station 104. The NUL/SUL selector 126 then can select the uplink carrier in accordance with the outputs of the channel status estimator 122 and the pathloss calculator 124.

As further discussed in more detail below, the base station 104 also monitors the performance of the NUL 110 and/or the SUL 112, additionally to the UE 102 or as an alternative to the UE 102. To this end, the components 132, 134, and 136 operate in a manner generally similar to that of the components 122, 124, and 126. However, the components 132, 134, and 136 in some implementations determine whether the performance of the NUL 110 and the SUL 112 meets certain additional conditions or, conversely, the components 132, 134, and 136 in other implementations can enforce fewer conditions that the components 122, 124, and 126.

Figure 2:
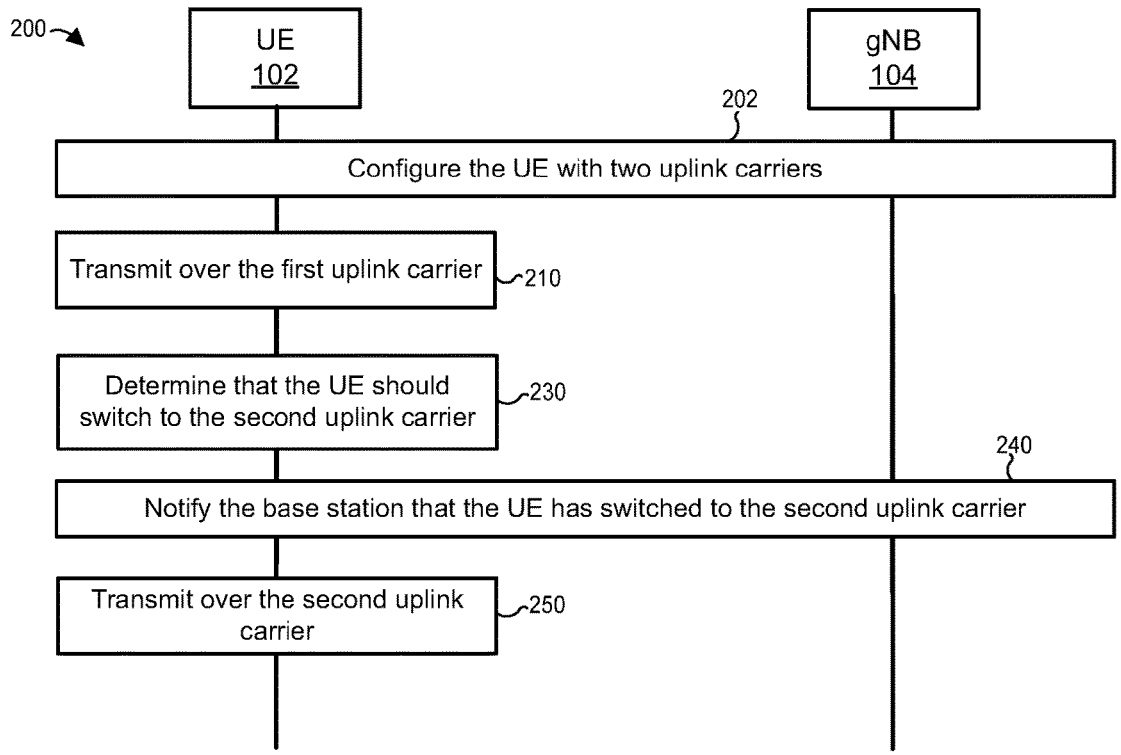
FIG. 2 is a messaging diagram of an example scenario in which the user device of FIG. 1 determines that it should switch from one uplink carrier to another uplink carrier.

Next, FIG. 2 illustrates a messaging diagram 200 of an example scenario in which the NUL/SUL selector 126 (or another suitable component of the UE 102) determines that that the UE 102 should switch from the NUL 110 to the SUL 112, or vice versa in some cases. Of course, after the UE 102 transmits data over the SUL 112 for some time, the NUL/SUL selector 126 in some cases can determine that the UE 102 should switch back to the NUL 110.

Figure 4:
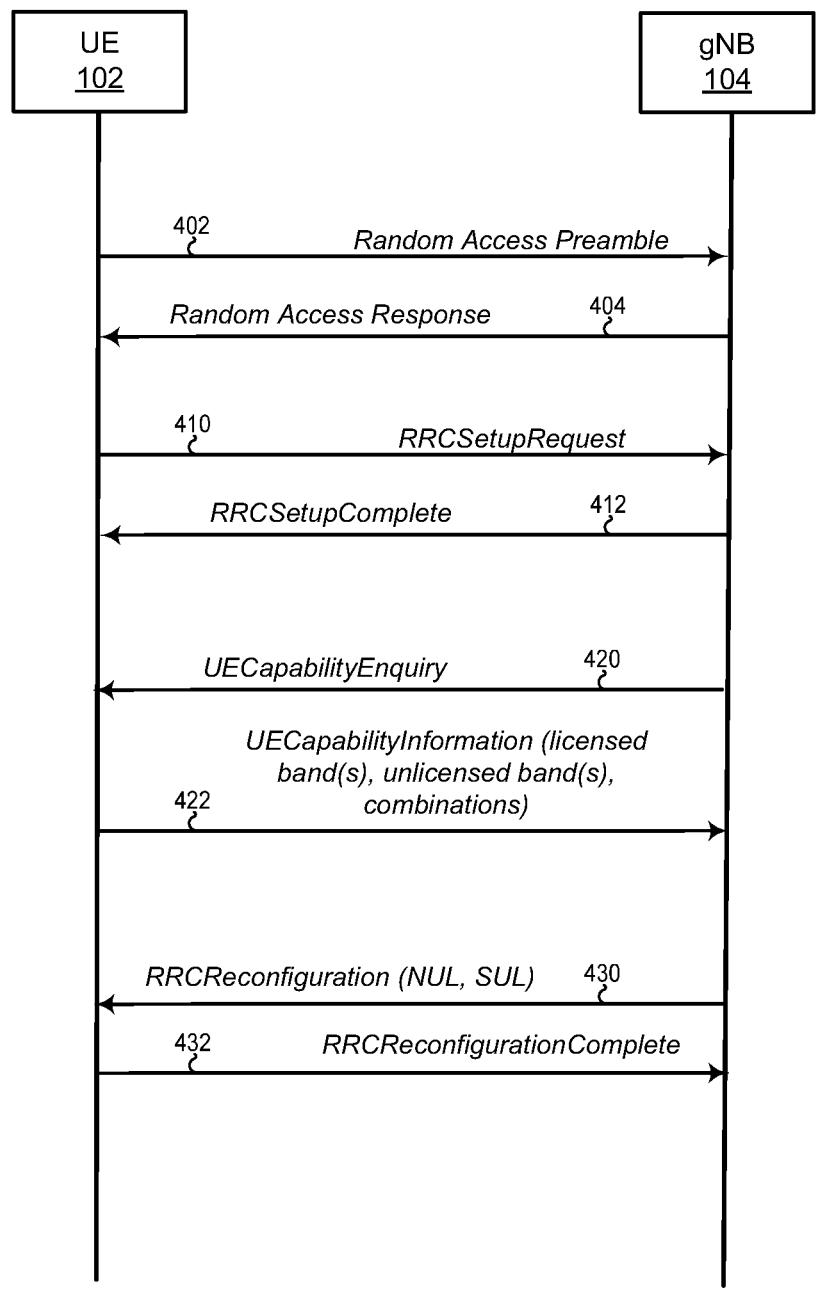
FIG. 4 is a messaging diagram of an example scenario in which the base station of FIG. 1 queries the user device to determine which licensed and unlicensed bands the user device supports, and configures the two uplink carriers accordingly.

At block 202, the base station or gNB 104 can configure the UE 102 with two uplink carriers, e.g., the NUL 110 and the SUL 112. As illustrated in FIG. 4, the UE 102 at block 202 can perform a procedure associated with a protocol for controlling radio resources between the UE 102 and the base station 104, e.g., the reconfiguration procedure of the Radio Resource Control (RRC) sublayer of the protocol communication stack.

In another implementation, the base station 104 configures the UE 102 with the first uplink carrier and the second uplink carrier via the RRCSetup message transmitted as a part of the RRC Connection Establishment procedure. In yet another implementation, the base station 104 configures the UE 102 with the first uplink carrier and the second uplink carrier via the RRCEstablishment message transmitted as a part of the RRC Re-Establishment procedure. In still another implementation, the base station 104 configures the UE 102 with the first uplink carrier and the second uplink carrier via the RRCResume message transmitted as a part of the RRC Connection Resume procedure.

As illustrated in FIG. 4 (see message 422), the UE 102 in implementations specifies, to the base station 104, its capability to operate in particular unlicensed bands, licensed bands, or combinations of licensed and unlicensed bands. Thus, the processing hardware 130 of the base station 104 can select the first uplink carrier and the second uplink carrier in view of which the transmission bands are accessible to the hardware of the UE 102. Further, when selecting the first uplink carrier and the second uplink carrier at block 202, the base station 104 can consider channel status. The channel status estimator 132 can apply the same logic (discussed in more detail below) to generate a channel status metric as during the process of determining whether the UE 102 should switch between uplink carriers.

With continued reference to FIG. 2, the UE 102 initially transmits data in the uplink direction over the first uplink carrier, at block 210. At block 230, the NUL/SUL selector 126 can determine that the UE 102 should switch to the second uplink carrier. An example procedure for determining, at a user device, whether one uplink carrier is preferable to another uplink carrier is discussed below with reference to FIG. 5.

When the UE 102 determines that it should not switch to the other uplink carrier, the UE 102 can continue to transmit data in the uplink direction over the first uplink carrier, similar to block 210. Otherwise, when the UE 102 determines that it should switch to the other uplink carrier, the UE 102 notifies the base station 104 at block 240.

In one example implementation, after the UE 102 switches to the second carrier, the UE 102 initiates a random access procedure on the newly selected carrier in order to inform the base station 104 of the switch. The base station 104 accordingly can allocate an uplink grant on the new uplink carrier, which the UE 102 can use in subsequent uplink transmissions.

In another implementation or scenario, when the UE 102 determines that it should switch from the first uplink to the second uplink carrier at block 230, the UE 102 already has an uplink grant to transmit uplink data over the first uplink carrier. In this case, at block 240 the UE 102 includes a MAC control element (including a logical channel ID, for example) in the uplink data to inform the UE 104 of the switch to the second uplink carrier. The base station 104 accordingly can allocate an uplink grant on the new uplink carrier, which the UE 102 can use in subsequent uplink transmissions. The UE 102 then can transmit data over the second uplink carrier, as illustrated in block 250.

Figure 3:
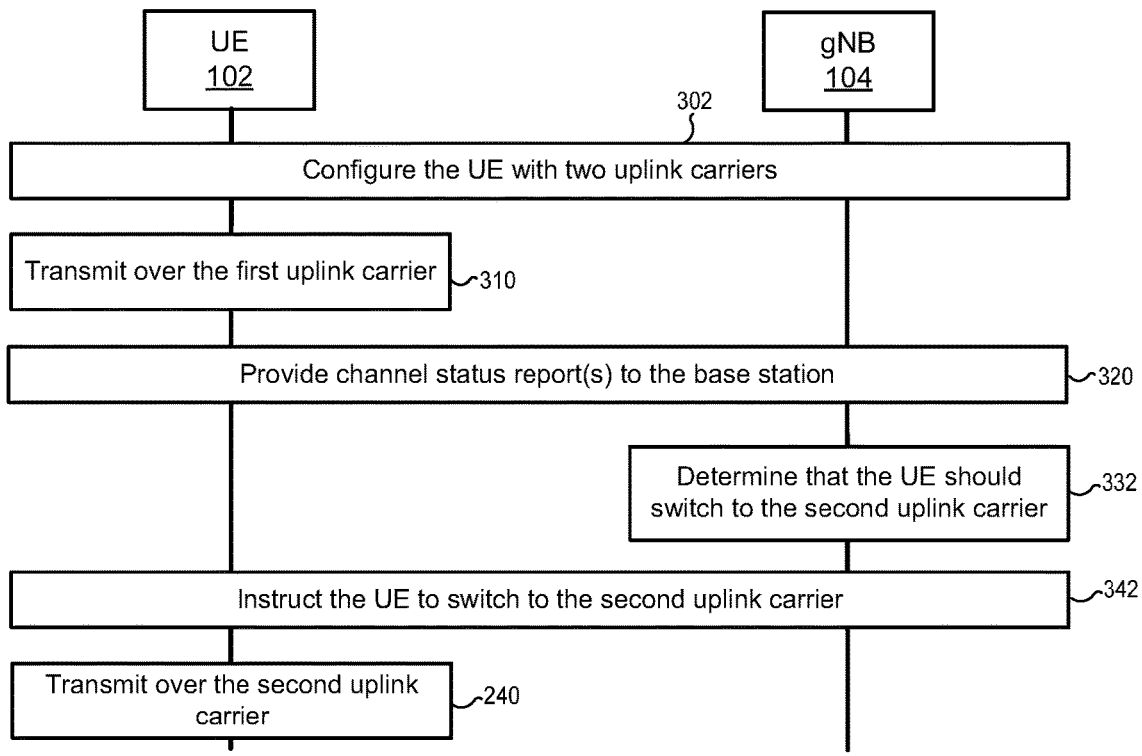
FIG. 3 is a messaging diagram of an example scenario in which the base station of FIG. 1 determines that the user device should switch from one uplink carrier to another uplink carrier.

FIG. 3 illustrates a messaging diagram 300 of an example scenario in which the NUL/SUL selector 136 (or another suitable component of the base station 104) determines that that the UE 102 should switch from the NUL 110 to the SUL 112, or vice versa in some cases. Blocks 302 and 310 in FIG. 3 are similar to blocks 202 and 210, respectively, discussed above with reference to FIG. 2.

At block 320, the UE 102 generates a first channel status metric for the first uplink carrier, a second channel status metric for the second uplink carrier, or both. Example techniques for generating these metrics are discussed with reference to FIG. 5 below. The UE 102 then provides these channel status metrics to the base station 104. The UE 102 in some cases also can provide the calculated pathloss values to the base station 104. In some implementations, the base station 104 specifies the periodicity for these reports, at block 302. Further, the base station 104 can specify, as a part of the configuration provided at block 302, conditions for reporting the channel status metrics (and possibly other metrics) to the base station 104. As one example, the base station 104 can specify that the UE 102 should report the channel status metrics only upon determining that the channel status metrics, pathloss calculations, etc. satisfy one or more conditions for switching to the second uplink carrier (see block 230 in FIG. 2).

In one implementation, the UE 102 sends the channel status metric(s) to the base station 104 as part of uplink control information. In another implementation, the UE 102 sends the channel status metric(s) to the base station 104 in a MAC control element (including a logical channel ID, for example). In yet another implementation, the UE 102 sends the channel status metric(s) to the base station 104 in a certain RRC message. For example, the UE 102 can transmit the channel status in the RRCMeasurementReport message during the measurement reporting procedure.

In one implementation, the UE 102 determines whether the one or more channel status metrics, pathloss calculations, etc. satisfy the one or several conditions for switching to another uplink carrier, similar to block 230. The UE 102 starts a timer at block 302 and, if the status metrics, pathloss calculations, etc. continue to satisfy the one or more conditions at block 320, the UE 102 reports the channel status metric(s) to the base station. Further, the UE 102 also can start a timer after switching to another uplink carrier, and not switch back to the first carrier before the timer expires, as discussed in more detail below.

At block 332, the base station 104 can determine that the UE 102 should switch to the second uplink carrier. An example procedure for determining, at a base station, whether one uplink carrier is preferable to another uplink carrier is discussed below with reference to FIG. 5.

The base station 104 at block 342 can instruct the UE 102 to switch to the second uplink carrier. The UE 102 begins to transmit data over the second uplink carrier at block 240.

Referring to both FIGS. 1 and 2, the UE 102 and the base station 104 can encounter a race condition when executing blocks 230 and 332, respectively. In this case, the base station 104 can transmit a command to the UE 102 to change the PCell or switch the uplink carrier, whereas the UE 102 can determine that it should perform a different switching procedure. A timer in this case improves the probability that the UE 102 can comply with the command from the base station 104.

For clarity, FIG. 4 illustrates an example scenario 400 in which the base station 104 queries the user device 102 to determine which licensed and unlicensed bands the user device supports, and configures the two uplink carriers accordingly.

According to the scenario 400, the UE 102 and the base station 104 first synchronize communications over an uplink carrier. To this end, the UE 102 first transmits 402 a random access preamble to the base station 104. The base station 104 transmits 404 a random access response 404. Upon establishing access to the uplink carrier in this manner, the UE 102 transmits 410 an RRCSetupRequest message, receives 412 an RRCSetupComplete message in response, and transitions to the RRC_CONNECTED state.

The base station 104 then queries the UE 102 by transmitting 420 a UECapabilityEnquiry message. The UE 102 responds with UECapabilityInformation that specifies one or more licensed bands, one or more unlicensed bands, and in some cases a combination of the one or more licensed bands and the one or more unlicensed bands in which the UE 102 can transmit over uplink carries.

The base station 104 uses the capabilities reported via the UECapabilityEnquiry message to configure the NUL 110 and the SUL 112, and transmits 430 the corresponding uplink carrier configuration to the UE 102 via an RRCReconfiguration message. The UE 112 configures the first uplink carrier and the second uplink carrier accordingly, and responds 432 with the RRCReconfigurationComplete message.

Figure 5:
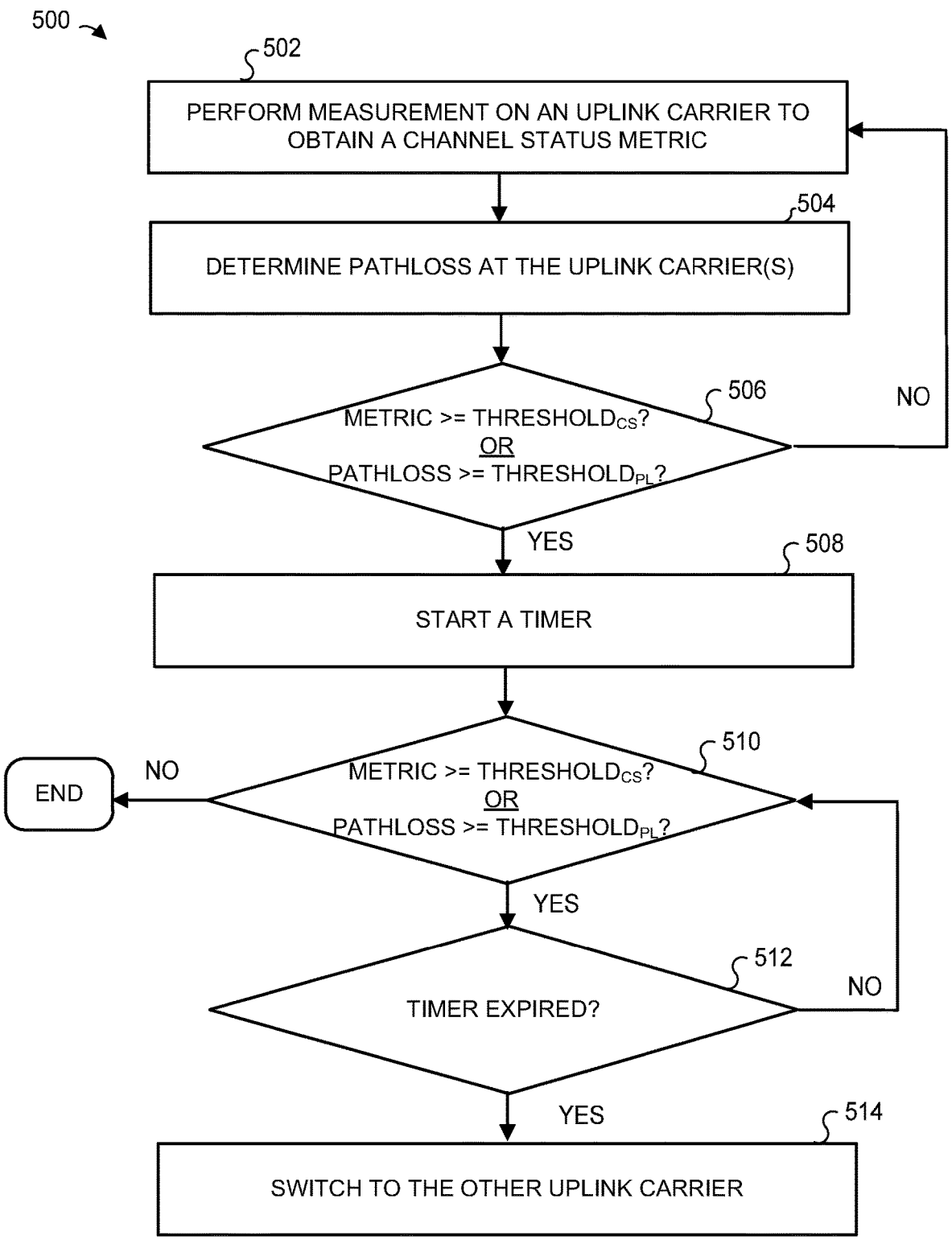
FIG. 5 is a flow diagram of an example method for determining whether the user device should switch from one uplink carrier to another uplink carrier, which can be implemented in the user device of FIG. 1.

Next, FIG. 5 illustrates an example method 500 for determining whether a user device should switch from one uplink carrier to another uplink carrier. The method 500 can be implemented in the modules 122, 124, and 126 (see FIG. 1), for example, or another suitable component or a set of components.

For clarity, in the discussion of measurements and calculations at the UE 102 and the base station 104 below, the terms "first," "second," etc. can apply to channel status metrics and pathloss values as follows: the UE 102 can generate the first channel status metric for the first carrier (which in an example implementation is the NUL in a high-frequency transmission band) and the second channel status metric for the second carrier (which in this example implementation is the SUL in a low-frequency transmission band); and the base station 104 can generate the third channel status metric for the first carrier and the fourth channel status metric for the second carrier; the UE 102 can calculate the first pathloss for the first carrier and the second pathloss for the second carrier, based on the corresponding sounding signals from the base station 104; and the UE base station 104 can calculate the third pathloss for the first carrier and the fourth pathloss for the second carrier, based on the corresponding sounding signals from the UE 102.

At block 502, the UE 102 performs a measurement on one or both uplink carriers to generate respective channel status metrics. The UE 102 for example can generate a first channel status metric for the first uplink carrier and a second channel status metric for the second uplink carrier.

In an example implementation, the UE 102 uses a moving average function, denoted as channel_status(i−1), to derive the channel status for the i-th measurement. Thus, channel_status (i)=a*channel_status(i−1)+(1−a)*measurement_result(i). The UE 102 can store a predefined value for the parameter a, or the UE 102 can receive the parameter a from the base station 104 at block 202 as a part of the configuration of the uplink carriers.

In some implementations, the UE 102 measures the power level on each measurement occasion, which can be the number of OFDM symbols in a received frame. If the received power level is higher than a certain threshold, the UE 102 can set the measurement result to a certain first value (e.g. "1"). Otherwise, if the measured power level is lower than a certain threshold, the UE 102 can set the measurement result to a second value (e.g. "0"). The UE 102 can store a predefined value of the threshold, or the UE 102 can receive this threshold from the base station 104 at block 202 or 302 as a part of the configuration of the uplink carriers.

In another implementation, the base station 104 allocates a time/frequency resource to the UE 102, and specifies this time/frequency resource during configuration at block 202. During the time period corresponding to the time/frequency resource, the base station 104 in this implementation does not perform any transmissions, so the UE 102 can measure the power level for the time/frequency tuple. This measurement does not take the transmission from the base station 104 into consideration, and thus yields a "clean" metric for the channel status in the proximity of the UE 102. If the received power level is higher than a threshold, the UE 102 sets the measurement result to a first value (e.g. "1"). Otherwise, if the measured power level is lower than a threshold, the UE 102 sets the measurement result to a second value (e.g. "0"). Similar to the examples above, the UE 102 can store a predefined value of the threshold, or the UE 102 can receive this threshold from the base station 104 at block 202 or 302 as a part of the configuration of the uplink carriers.

In yet another implementation, the base station 104 similarly allocates a time/frequency resource to the UE 102, and specifies this time/frequency resource during configuration at block 202 or 302. During the time period corresponding to the time/frequency resource, the base station in this implementation transmits a reference signal to user devices including the UE 102. The UEs know the transmit power and time/frequency resources for the reference signal from system information, dedicated RRC messages, or pre-defined rules. The UE 102 in this case obtains the measurement result on the time/frequency resource by calculating the Signal-to-Interference ratio or the Reference Signal Received Quality (RSRQ). In some implementations, the measurement result can correspond to the inverted signal-to-interference ratio or inverted RSRQ.

At block 504, the UE 102 determines pathloss on one or both uplink carriers. In an example implementation, the UE 102 determines a first pathloss on the first uplink carrier and a second pathloss on second uplink carrier. The UE 102 can obtain the first and second pathloss from reference signals which the base station 104 transmits. Examples of such reference signals include a cell reference signal, Channel Status Information Reference Signal (CSI-RS), and a demodulation reference signal.

In various implementations, the UE 102 can determine that it should switch from one uplink carrier to another uplink carrier upon determining that one or more channel status metrics, pathloss calculations, etc. satisfy one or several conditions discussed next.

For example, at block 506, the UE 102 compares the channel status metric and/or the determined pathloss to corresponding thresholds. According to one implementation, the UE 102 determines that it should switch to the second uplink carrier if the first channel status metric is equal to exceeds a certain channel status threshold (a larger value of the channel status metric in this case corresponds to worse performance of the carrier), or if the first pathloss is equal to exceeds the corresponding pathloss threshold. For example, the first channel status metric and the first pathloss can correspond to the NUL 110. Thus, when the NUL 110 is allocated within a high-frequency transmission band and the SUL is allocated within a low-frequency transmission band, and when the UE 102 experiences large pathloss, high interference, or high traffic load on the high-frequency carrier, the UE 102 can switch to the low-frequency carrier to improve coverage or channel connection.

According to another example condition, the UE 102 switches from the second uplink carrier to the first uplink carrier when the first pathloss is less than or equal to a certain threshold and the first channel status metric is less than or equal to another threshold. Thus, when the NUL 110 is allocated within a high-frequency transmission band and the SUL is allocated within a low-frequency transmission band, and when the UE 102 detects low pathloss and low interference/traffic load on the high-frequency carrier, the UE 102 can switch to the high-frequency carrier to boost uplink transmission rate. As noted above, typically there is more transmission bandwidth in high-frequency spectrum, and thus using high-frequency spectrum to transmit data can increase data transmission rate.

According to another example condition, the UE 102 switches from the second uplink carrier to the first uplink carrier if the first pathloss is less than a certain threshold, the first channel status metric is less than another threshold, and the second channel status metric exceeds or is equal to another threshold. This condition is similar to the preceding one, but the UE 102 in this case also considers the channel status metric for the second carrier. If the channel status metric of the second carrier is not sufficiently large, the UE 102 in this implementation does not switch to the first carrier, which can prevent frequent switching between two carriers.

According to another example condition, the UE 102 switches from the second uplink carrier to the first uplink carrier if the first pathloss is less than or equal to a certain threshold and the first channel status metric is less than or equal to a sum of the second channel status metric and a certain offset. In other words, according to this condition, the difference between the first channel status metric and the second channel status metric must be sufficiently large.

When the UE 102 determines at block that one or more conditions have been satisfied, the flow proceeds to block 508. Otherwise, the flow returns to block 502, and the UE 102 continues to transmit over the first uplink carrier. At block 508, the UE 102 can start a timer to determine whether the one or more channel status metrics, pathloss calculations, etc. continues to satisfy the one or several conditions satisfied at block 506, during a certain period of time. In another implementation, however, the flow proceeds directly from block 506 to block 514 when the one or more conditions have been satisfied.

At block 510, the UE 102 checks the same condition as in block 506. If the channel status metrics, pathloss calculations, etc. satisfy the condition, the UE 102 checks whether the time has expired at block 512. The method 500 terminates otherwise. The flow returns to block 510 if the timer has not yet expired. Otherwise, the flow proceeds to block 514, where the UE 102 switches to another uplink carrier. Generally speaking, the mechanism of blocks 508-512 can prevent the "ping pong" effect of continuously switching between two uplink carriers.

In an alternative implementation, the UE 102 starts a timer after the UE 102 switching from the first uplink carrier to the second uplink carrier. The UE 102 does not switch back to the first carrier before the timer expires. Similar to the mechanism of blocks 508-512 discussed above, this technique prevents the ping pong effect of frequently switching between uplink carriers.

In some cases, after the UE 102 switches from one uplink carrier to another uplink carrier, the UE 102 aborts the channel access procedure the UE 102 was performing on the previous carrier when the previous carrier is allocated in unlicensed transmission band, or the UE 102 aborts the random access procedure that the UE is performing on the previous carrier when the previous carrier is allocated in unlicensed transmission band.

Figure 6:
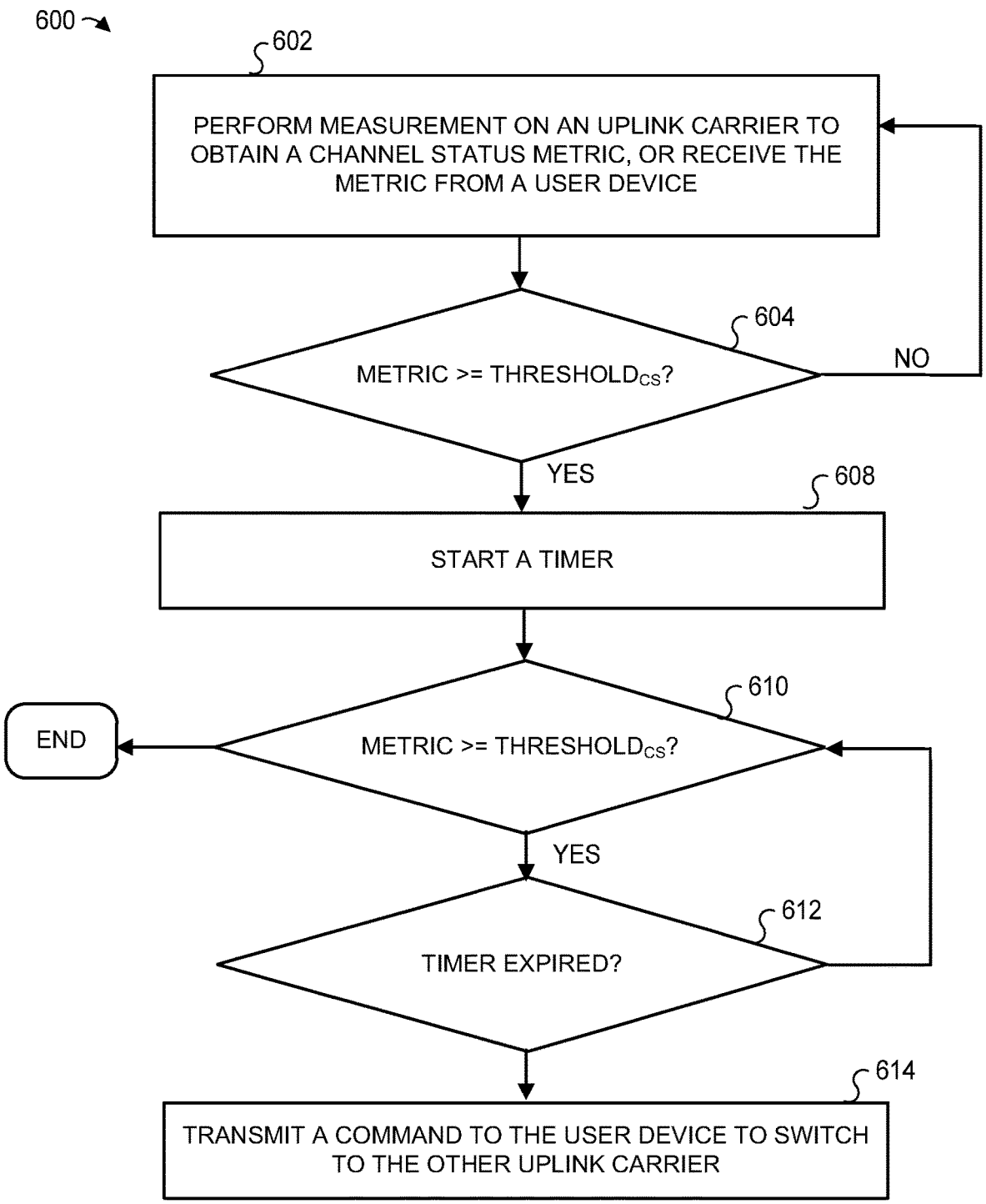
FIG. 6 is a flow diagram of an example method for determining whether the user device should switch from one uplink carrier to another uplink carrier, which can be implemented in the base station of FIG. 1.

FIG. 6 illustrates an example method 600 for determining whether a user device should switch from one uplink carrier to another uplink carrier. The method 600 can be implemented in the modules 132, 134, and 136 (see FIG. 1), for example, or another suitable component or a set of components.

At block 602, the base station 104 in various implementations can perform a measurement on an uplink carrier, perform measurements on both uplink carriers, and/or receive one or more channel status metrics from the UE 102.

When measuring power on the first uplink carrier, the base station 104 can determine that the measured power level is higher than a power threshold and set the measurement result is set to a first value (e.g. "1"). When the base station 104 determines that the measured power level is not higher than the power threshold, the UE 102 can set the measurement result is set to a second value (e.g. "0"). To generate the third channel status metric for the i-th measurement, the base station 104 can apply the formula channel_status(i)=a*channel_status(i−1)+(1−a)*measurement_result(i), similar to the UE 102 (see the discussion of block 502).

In an example scenario, the base station 104 derives a third pathloss and a third channel status on the first carrier, and calculates a fourth pathloss and a fourth channel status on the second carrier. To calculate the third pathloss, the UE 102 can transmit a sounding reference signal, and the base station 104 can determine the third pathloss based on the sounding reference single. When the base station 104 receives a channel status metric or a reference signal from UE 102, the base station 104 determines whether the UE 102 should switch uplink carriers. Further, in some implementations, the base station 104 periodically checks whether the UE 102 should switch uplink carriers and, to this end, the base station 104 periodically performs measurements on the first uplink carrier and the second uplink carrier.

At block 604, the base station 104 compares one or more metrics, pathloss indications, etc. to respective thresholds. The base station 104 then can determine whether these comparisons satisfy one or more conditions for instructing the UE 102 to switch uplink carriers.

One example condition is that the first channel status metric be greater than or equal to a certain channel status threshold. If the first channel status and the channel status threshold satisfy this condition, the base station 104 can instruct the UE to switch from the first uplink carrier to the second uplink carrier. This base station 104 may encounter this situation when high interference and/or traffic load occur on the first uplink carrier.

According to another example condition, the third channel status metric is greater than a certain channel status threshold. The base station 104 in this case can instruct the UE 102 to switch from the first uplink carrier to the second uplink carrier. This situation may be due to high interference or high traffic load on the first uplink carrier. Unlike the previous scenario, the base station 104 here determines that the UE 102 should switch uplink carriers based on the assessment of a channel at the base station 104 rather than at the UE 102.

According to another example condition, the base station 104 determines that the first channel status metric is less than or equal to a certain threshold, and the third channel status metric is less than or equal to another threshold. In this scenario, the first uplink carrier (to which the first channel status metric corresponds) is in a high-frequency transmission band, and therefore has higher bandwidth. The second uplink carrier accordingly is in a low-frequency transmission band, with lower bandwidth. The base station 104 in this case instructs the UE 102 to switch from the second uplink carrier to the first uplink carrier. This may occur when the interference/traffic load in the proximity of the UE 102 and the base station 104 becomes relatively low on the first uplink carrier. The base station 104 accordingly can instruct the UE 102 to switch the uplink carrier so as to increase the uplink data transmission rate.

In another implementation, when the base station 104 determines that the first channel status metric is less or equal to than a certain channel status threshold, that the third channel status metric is less than or equal to another channel status threshold, and that the third pathloss is less than or equal to another threshold, the base station 104 instructs the UE 102 to switch from the second uplink carrier to the first uplink carrier.

As illustrated in blocks 608-612, when the metrics, pathloss indications, etc. satisfy one or more conditions discussed above, the base station 104 can start a timer. If the one or more conditions are still satisfied upon timer expiration (block 612), the flow proceeds to block 614. Otherwise, the method 600 terminates after block 610. Similar to the discussion above with reference to FIG. 5, using a timer at blocks 608-612 prevent the effect of ping-ponging between the two uplink carriers.

At block 614, the base station 104 transmits, to the UE 102, a command to switch to the other uplink carrier. In one implementation, the base station 104 transmits a downlink control element (DCI) on Physical Downlink Control Channel (PDCCH) to instruct the UE 102 to perform carrier switching. According to another implementation, the base station 104 transmits to the UE 102 a MAC control element to instruct the UE 102 to perform carrier switching, similar to the examples above. In yet another implementation, the base station 104 transmits an RRC message to instruct the UE 102 to perform uplink carrier switching. For example, the base station 104 can transmit the channel status in an RRCReconfiguration message during the RRC reconfiguration procedure.

Similar to the situations when the UE 102 determines that it should switch uplink carriers, the UE 102 can use a timer in the situations where the base station 104 instructs the UE 102 to switch uplink carriers. This timer can prevent the UE 102 from switching back to the other carrier before the timer expires and potentially creating a situation which the UE 102 frequently switches between the first uplink carrier and the second uplink carrier.

Figure 7:
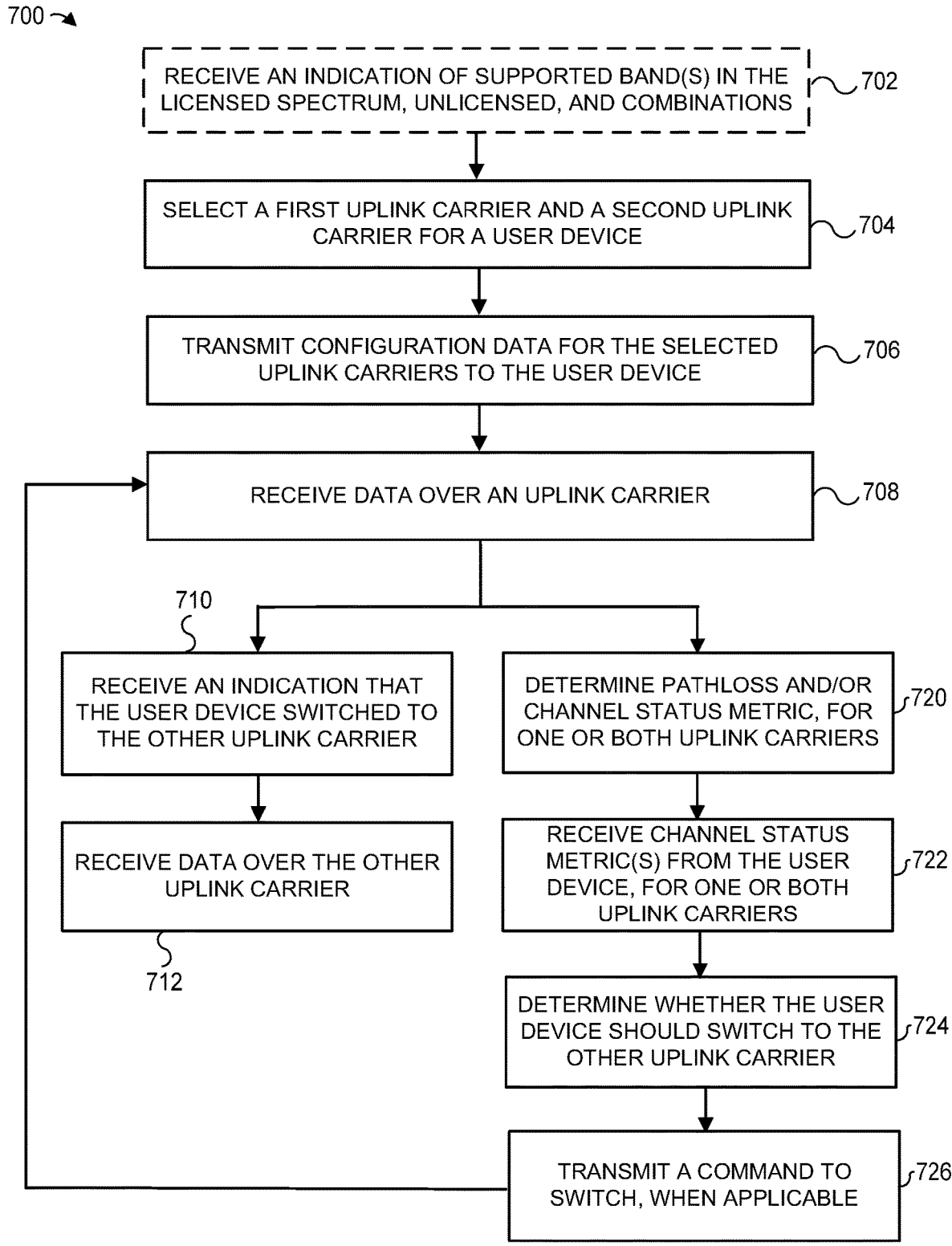
FIG. 7 is a flow diagram of an example method for configuring a user device with two uplink carriers and receiving data over these uplink carriers, which can be implemented in the base station of FIG. 1.
Figure 8:
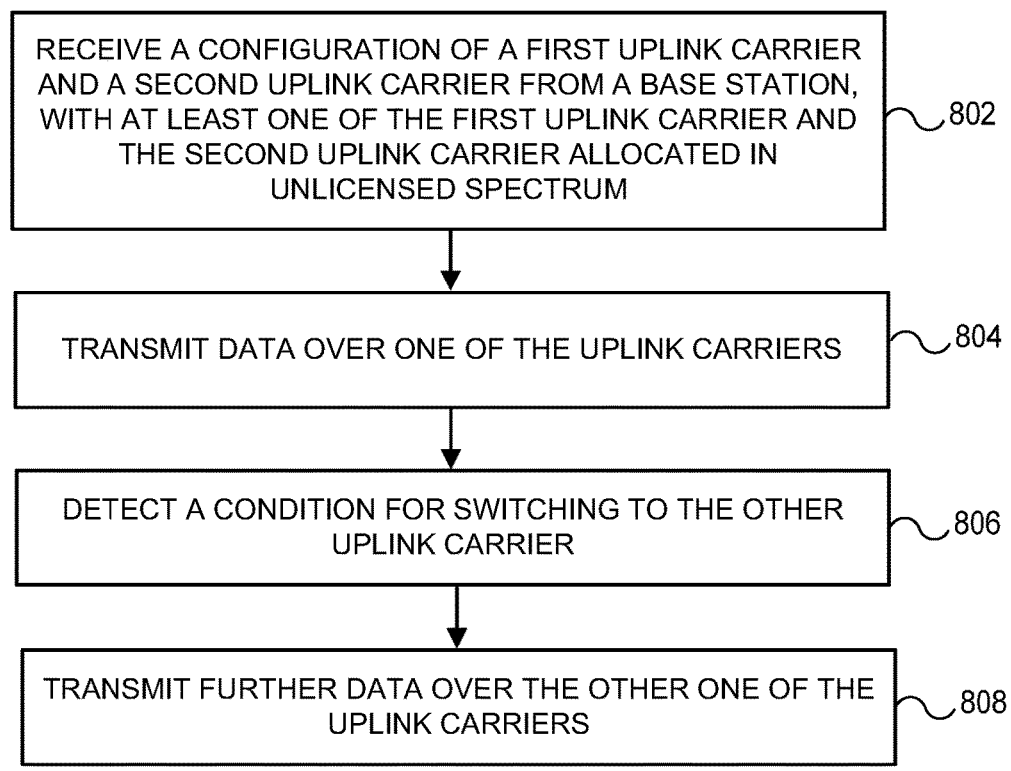
FIG. 8 is a flow diagram of an example method for transmitting data over one of two uplink carriers, which can be implemented in the user device of FIG. 1.

For further clarity, FIG. 7 illustrates an example method 700 in a user device for configuring a base station with two uplink carriers and receiving data over these uplink carriers, and FIG. 8 illustrates an example method 800 in a user device for transmitting data over one of two uplink carriers. The methods 700 and 800 can be implemented in the UE 102 and the base station 104, respectively, or in any other suitable devices.

Referring first to FIG. 7, the method 700 can begin at a step 702, where the base station receives an indication of support bands in licensed and unlicensed spectrum from a user device. Alternatively, a base station can be pre-configured with certain transmission bands which each user device presumably can access. Thus, the method 700 in other implementations begins at block 704.

In any case, the base station at block 704 selects a first uplink carrier and a second uplink carrier for a user device. One or both uplink carriers can operate in unlicensed spectrum. At block 706, the base station transmits the configuration of the two uplink carriers to the user device.

The base station receives data via the first uplink carrier at block 708. When the base station receives an indication that the user device switched to the other uplink carrier (block 710), the base station receives further data over the other uplink carrier at block 712.

Further, the base station in some cases can determine one or more pathloss values and one or more channel status metrics at block 720. The base station also can receive one or more pathloss values and one or more channel status metrics from the user device at block 722. Using any suitable combination of these metrics, measurements, etc. generated at the base station and/or the use device, the base station can determine whether the user device should switch to the other uplink carrier (block 724). The base station can transmit a command to the user device, instructing the use device to switch uplink carriers (block 726), after the base station determines at block 724 the user device should switch uplink carriers.

Finally, the method 800 in a user device begins at block 802, where the user device receives a configuration of a first uplink carrier and a second uplink carrier, with at least one of the first uplink carrier and the second uplink carrier allocated in unlicensed spectrum. The user device transmits over one of the uplink carriers at block 804. After the user device detects a condition for switching uplink transmissions to the other carrier at block 806, the user device transmits further data over the other carrier at block 808.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for configuring and using multiple uplink carriers in a cell through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

The following list of aspects reflects a variety of the embodiments explicitly contemplated by the present disclosure.

Aspect 1. A method in a base station for configuring uplink communications in an unlicensed spectrum comprises selecting, by processing hardware, a first uplink carrier and a second uplink carrier for a cell, respectively, with at least one of the first uplink carrier and the second uplink carrier operating within one or more unlicensed bands a user device supports; transmitting, by the processing hardware to the user device, configuration data for the first uplink carrier and the second uplink carrier, including transmitting an indication that one of the first uplink carrier and the second uplink carrier is a normal uplink carrier (NUL), and the other one of the first uplink carrier and the second uplink carrier is a supplementary uplink carrier (SUL), where the user device is configured to initially transmit via the NUL; and receiving uplink data via the second uplink carrier upon the user device switching uplink transmissions from the first uplink carrier to the second uplink carrier.

Aspect 2. The method of aspect 1, further comprising, prior to receiving uplink data via the second uplink carrier: receiving, by the processing hardware from the user device, a notification that the user device switched from the first uplink carrier to the second uplink carrier.

Aspect 3. The method of aspect 2, where receiving the notification includes: allocating, by the processing hardware, an uplink grant to the user device in response to the user device initiating a random access procedure on the second uplink carrier, and transmitting, by the processing hardware, the uplink grant to the user device.

Aspect 4. The method of aspect 2, where receiving the notification includes receiving the notification in a control element at a media access control (MAC) layer, transmitted by the user device over the first uplink carrier.

Aspect 5. The method of aspect 2, further comprising: calculating, by the processing hardware, a channel status indicative of a current condition of the second uplink carrier; selecting, by the processing hardware and based on the calculated channel status metric, the first uplink carrier for the user device; and transmitting a command to the user device to switch from the second uplink carrier back to the first uplink carrier Aspect 6. The method of aspect 1, further comprising: determining, by the processing hardware, that the user device should switch from the first uplink carrier to the second uplink carrier; and transmitting, by the processing hardware to the user device, a command to the user device to switch from the first uplink carrier to the second uplink carrier.

Aspect 7. The method of aspect 6, where determining that the user device should switch from the first uplink carrier to the second uplink carrier includes at least one of: (i) receiving, from the user device, a first channel status metric indicative of a current condition of the first uplink carrier, (ii) receiving, from the user device, a second channel status metric indicative of a current condition of the second uplink carrier, (iii) receiving, from the user device, a first sounding reference signal indicative of a first pathloss, at the first uplink carrier, (iv) receiving, from the user device, a second sounding reference signal indicative a third pathloss, at the second uplink carrier, (v) calculating, at the base station, a third channel status metric indicative a current condition of the first uplink carrier, or (vi) calculating, at the base station, a fourth channel status metric indicative a current condition of the second uplink carrier.

Aspect 8. The method of aspect 7, where calculating the third channel status or the fourth channel status includes measuring, for a corresponding carrier, one of: (i) an amount of interference on the carrier, (ii) an amount of traffic on the carrier, (iii) a power level, or (ii) a moving average of power levels.

Aspect 9. The method of aspect 7, further comprising transmitting, by the processing hardware to the user device, an indication of a frequency and/or conditions for transmitting the first channel status and/or the second channel status metric.

Aspect 10. The method of any of aspects 7-9, where determining that the user device should switch from the first uplink carrier to the second uplink carrier includes comparing the first channel status metric to a first channel status threshold.

Aspect 11. The method of any of the aspects 7-9, where determining that the user device should switch from the first uplink carrier to the second uplink carrier includes comparing the third channel status metric to a third channel status threshold value.

Aspect 12. The method of any of the aspects 7-9, where determining that the user device should switch from the first uplink carrier to the second uplink carrier includes comparing the first channel status and the third channel status to respective channel status thresholds.

Aspect 13. The method of any of the aspects 7-9, where determining that the user device should switch from the first uplink carrier to the second uplink carrier includes: comparing the first channel status metric to the first channel status threshold, comparing the third channel status metric to the third channel status threshold, and comparing the first sounding reference signal to a pathloss threshold.

Aspect 14. The method of any of the aspects 7-9, where determining that the user device should switch from the first uplink carrier to the second uplink carrier includes: comparing the second channel status metric to the second channel status threshold, comparing the fourth channel status metric to the fourth channel status threshold, and comparing the second sounding reference signal to a pathloss threshold.

Aspect 15. The method of aspect 6, where transmitting the command to the user device includes transmitting the command in one of (i) a downlink control element (DCI), (ii) a media access channel (MAC) control element, or (iii) a message of a protocol for controlling radio resources between the user device and the base station.

Aspect 16. The method of aspect 6, further comprising: transmitting, by the processing hardware, a command to the user device to prevent the user device from switching back to the first uplink carrier during a certain period of time.

Aspect 17. The method of any of the preceding aspects, where: selecting the first uplink carrier includes selecting the first uplink carrier in a high-frequency transmission band, and selecting the second uplink carrier includes selecting the second uplink carrier in a low-frequency transmission band, where respective central frequencies of the high-frequency transmission band and the low-frequency transmission band are separated by at least 20 MHz.

Aspect 18. The method of any of the preceding aspects, wherein selecting the first uplink carrier and the second uplink carrier includes selecting both the first uplink carrier and the second uplink carrier from within the one or more unlicensed bands.

Aspect 19. The method of any of the preceding aspects, further comprising prior to selecting: receiving, from the user device, an indication of the one or more unlicensed bands the user device supports.

Aspect 20. The method of any of the preceding aspects, further comprising prior to selecting: receiving, from the user device, an indication of one or more licensed bands the user device supports.

Aspect 21. The method of any of the preceding aspects, where transmitting the configuration data to the user device includes: transmitting the configuration data during one of (i) a procedure for establishing a connection associated with a protocol for controlling radio resources between the base station and the user device, (ii) a procedure for re-establishing a connection associated with the protocol, and (iii) a procedure for resuming a connection associated with the protocol.

Aspect 22. A method in a user device for uplink communications comprises: receiving, by processing hardware from a base station for a certain cell, a configuration of a first uplink carrier and a second uplink carrier, where at least one of the first uplink carrier and the second uplink carrier are allocated in an unlicensed spectrum; receiving, by the processing hardware, an indication that the first uplink carrier is a normal uplink carrier (NUL), and the second one uplink carrier is a supplementary uplink carrier (SUL); transmitting, by the processing hardware, data over the NUL; detecting a condition for switching uplink transmissions from the NUL to the SUL; and in response to detecting the condition, transmitting further data over the SUL.

Aspect 23. The method of aspect 22, where detecting the condition comprises: determining, by the processing hardware, a first pathloss on the NUL; and determining, by the processing hardware, a first channel status metric indicative of a current condition of the NUL.

Aspect 24. The method aspect 23, where detecting the condition includes comparing the first pathloss to a first pathloss threshold and the first channel status metric to a channel status threshold.

Aspect 25. The method of aspect 23, further comprising: determining, by the processing hardware, a second pathloss on the NUL; where detecting the condition includes comparing the first pathloss to a first pathloss threshold, the first channel status metric to a channel status threshold, and the second pathloss to a second pathloss threshold.

Aspect 26. The method of aspect 23, where calculating the first channel status metric includes measuring, for the first uplink carrier, one of: (i) an amount of interference on the carrier, (ii) an amount of traffic on the carrier, (iii) a power level, or (ii) a moving average of power levels.

Aspect 27. The method of aspect 22, where detecting the condition includes receiving a command from the base station to switch from the NUL to the SUL.

Aspect 28. The method of aspect 22, further comprising in response to detecting the condition: transmitting, by the processing hardware to the base station, a notification that the user device switched from the NUL to the SUL.

Aspect 29. The method of aspect 28, where transmitting the notification includes: initiating, by the processing hardware, a random access procedure on the second uplink carrier, and receiving, from the base station, an uplink grant in response to the initiated random access procedure.

Aspect 30. The method of aspect 28, where transmitting the notification includes transmitting the notification in a control element at a MAC layer, over the NUL.

Aspect 31. The method of aspect 28, further comprising in response to transmitting the notification: receiving, by the processing hardware, a command from the base station to switch from the SUL back to the NUL.

Aspect 32. The method according to any of the aspects 22-27, further comprising: transmitting, by the processing hardware, a notification that the user device switched from the NUL to the SUL.

Aspect 33. The method according to any of the aspects 23-28, further comprising: preventing the user device from switching from the second uplink carrier to the first uplink carrier for a certain period of time after the transmitting further data.

What is claimed is:

1. A method in a base station for configuring uplink communications in an unlicensed spectrum, the method comprising:
   selecting a first uplink carrier and a second uplink carrier for a cell, respectively, with at least one of the first uplink carrier and the second uplink carrier operating within one or more unlicensed bands a user device supports;
   transmitting, to the user device, configuration data for the first uplink carrier and the second uplink carrier, including transmitting (i) an indication that one of the first uplink carrier and the second uplink carrier is a normal uplink carrier (NUL), and the other one of the first uplink carrier and the second uplink carrier is a supplementary uplink carrier (SUL), and (ii) a threshold value of a power level the UE measures on the first uplink carrier and/or the second uplink carrier, wherein the user device is configured to initially transmit via the NUL;
   receiving, from the user device, a notification that the user device switched, in response to a determination at the user device, from the first uplink carrier to the second uplink carrier; and
   receiving uplink data via the second uplink carrier upon the user device switching uplink transmissions from the first uplink carrier to the second uplink carrier.

2. The method of claim 1, wherein receiving the notification includes:
   allocating an uplink grant to the user device in response to the user device initiating a random access procedure on the second uplink carrier, and
   transmitting the uplink grant to the user device.

3. The method of claim 1, further comprising:
   calculating a channel status indicative of a current condition of the second uplink carrier;
   selecting, based on the calculated channel status metric, the first uplink carrier for the user device; and
   transmitting a command to the user device to switch from the second uplink carrier back to the first uplink carrier.

4. The method of claim 1, further comprising:
   transmitting, to the user device, an indication of a frequency and/or conditions for generating, at the user device, and transmitting to the base station, a first channel status metric indicative of a current condition of the first uplink carrier and/or a second channel status metric indicative of a current condition of the second uplink carrier.

5. The method of claim 1, further comprising:
   transmitting a command to the user device to prevent the user device from switching back to the first uplink carrier during a certain period of time.

6. The method of claim 1, wherein:
   selecting the first uplink carrier includes selecting the first uplink carrier in a high-frequency transmission band, and
   selecting the second uplink carrier includes selecting the second uplink carrier in a low-frequency transmission band,
   wherein respective central frequencies of the high-frequency transmission band and the low-frequency transmission band are separated by at least 20 MHz.

7. The method of claim 1, further comprising prior to selecting:
   receiving, from the user device, at least one of:
   an indication of the one or more unlicensed bands the user device supports, or
   an indication of one or more licensed bands the user device supports.

8. A method in a user device for uplink communications, the method comprising:
   receiving, from a base station for a certain cell, a configuration of a first uplink carrier and a second uplink carrier, wherein at least one of the first uplink carrier and the second uplink carrier are allocated in an unlicensed spectrum;
   receiving an indication that the first uplink carrier is a normal uplink carrier (NUL), and the second one uplink carrier is a supplementary uplink carrier (SUL);
   transmitting data over the NUL;
   determining that a pathloss on the SUL satisfies a condition for switching uplink transmissions from the NUL to the SUL;
   in response to the detecting of the condition, transmitting further data over the SUL; and
   transmitting, to the base station and in response to the detecting of the condition, a notification that the user device switched from the NUL to the SUL.

9. The method of claim 8, further comprising:
   determining a first pathloss on the NUL; and
   determining a first channel status metric indicative of a current condition of the NUL.

10. The method claim 9, wherein detecting the condition includes comparing the first pathloss to a first pathloss threshold and the first channel status metric to a channel status threshold.

11. The method of claim 9, wherein:
    the pathloss on the SUL is a second pathloss;
    the method further comprising:
    comparing the first pathloss to a first pathloss threshold, the first channel status metric to a channel status threshold, and the second pathloss to a second pathloss threshold.

12. The method of claim 8, wherein transmitting the notification includes:
    initiating a random access procedure on the second uplink carrier, and
    receiving, from the base station, an uplink grant in response to the initiated random access procedure.

13. The method of claim 12, further comprising in response to transmitting the notification:
    receiving a command from the base station to switch from the second uplink carrier back to the first uplink carrier.

14. The method according to claim 8, further comprising:
    preventing the user device from switching from the SUL to the NUL for a certain period of time after the transmitting further data.

15. A user device (UE) comprising:
    a transceiver; and
    processing hardware; the UE configured to:
    receive, from a base station for a certain cell, a configuration of a first uplink carrier and a second uplink carrier, wherein at least one of the first uplink carrier and the second uplink carrier are allocated in an unlicensed spectrum;

receive, an indication that the first uplink carrier is a normal uplink carrier (NUL), and the second one uplink carrier is a supplementary uplink carrier (SUL);

transmit data over the NUL;

determine that a pathloss on the SUL satisfies a condition for switching uplink transmissions from the NUL to the SUL;

in response to the detecting of the condition, transmit further data over the SUL; and transmit, to the base station and in response to the detecting of the condition, a notification that the user device switched from the NUL to the SUL.

16. The UE of claim 15, further configured to:

determine first pathloss on the NUL, wherein the pathloss on the SUL is a second pathloss;

determine a first channel status metric indicative of a current condition of the NUL; and to detect the condition for switching uplink transmissions from the NUL to the SUL, the UE is configured to compare the first pathloss to a first pathloss threshold and the first channel status metric to a channel status threshold.

* * * * *